(12) United States Patent
Schmalz et al.

(10) Patent No.: US 6,945,277 B2
(45) Date of Patent: Sep. 20, 2005

(54) UNDERPRESSURE VALVE

(75) Inventors: Kurt Schmalz, Dornstetten (DE);
Gernot Schmierer, Herrenberg (DE);
Thomas Eisele, Fluorn-Winzeln (DE);
Daniel Heine, Dornstetten (DE); Dieter
Geissler, Enzklösterle (DE); Leonhard
Harter, Lossburg-Wittendorf (DE);
Daniel Grözinger, Betzweiler-Wälde
(DE)

(73) Assignee: J. Schmalz GmbH, Glatten (DE)

( * ) Notice: Subject to any disclaimer, the term of this patent is extended or adjusted under 35 U.S.C. 154(b) by 83 days.

(21) Appl. No.: 10/405,810

(22) Filed: Apr. 3, 2003

(65) Prior Publication Data
US 2003/0188790 A1 Oct. 9, 2003

(30) Foreign Application Priority Data
Apr. 8, 2002 (DE) .......................... 102 16 220

(51) Int. Cl.$^7$ .......................... F16K 15/14; F16K 7/17; F16K 51/02
(52) U.S. Cl. ............... 137/859; 137/512.15; 137/515.5; 137/510; 137/907
(58) Field of Search ................ 137/510, 517, 137/907, 512.15, 515, 515.5, 852, 859

(56) References Cited

U.S. PATENT DOCUMENTS

| | | | | |
|---|---|---|---|---|
| 3,465,786 A | * | 9/1969 | Spisak | 137/516.27 |
| 3,633,605 A | * | 1/1972 | Smith | 137/113 |
| 5,025,829 A | * | 6/1991 | Edwards et al. | 137/512 |
| 5,727,594 A | * | 3/1998 | Choksi | 137/859 |
| 6,089,272 A | * | 7/2000 | Brand et al. | 137/859 |
| 6,240,962 B1 | * | 6/2001 | Tai et al. | 137/859 |

FOREIGN PATENT DOCUMENTS

| | | |
|---|---|---|
| DE | 29 42 876 | 5/1980 |
| DE | 35 31 010 | 2/1987 |
| DE | 88 15 392 | 5/1989 |
| DE | 40 07 427 | 10/1990 |
| DE | 44 46 170 | 6/1996 |
| DE | 198 14 262 | 10/1999 |
| DE | 198 54 540 | 6/2000 |
| WO | WO 93/01433 | 1/1993 |

* cited by examiner

Primary Examiner—Ramesh Krishnamurthy
(74) Attorney, Agent, or Firm—Paul Vincent

(57) ABSTRACT

The invention concerns an underpressure valve with a multi-part housing and a disc-like closing body which has at least one opening, and with an opening-free section disposed in alignment with the flow channel of the housing.

17 Claims, 1 Drawing Sheet

UNDERPRESSURE VALVE

This application claims Paris Convention priority of DE 102 16 220.4 filed Apr. 08, 2002 the complete disclosure of which is hereby incorporated by reference.

BACKGROUND OF THE INVENTION

The invention concerns an underpressure valve comprising a multi-part housing and a disc-like closing body.

DE 198 14 262 A1 discloses a valve for underpressure handling or clamping means which comprises a multi-part housing and a plunger disposed inside the housing for displacement in a longitudinal direction. One end of the plunger comprises a valve body which closes the valve to prevent any leaking flow when no object is being suctioned. Although this valve minimizes any leaking flow, the design of the valve is relatively demanding and therefore expensive.

It is the underlying object of the invention to provide an underpressure valve of simple construction which nevertheless has small leaking air flow.

SUMMARY OF THE INVENTION

This object is achieved in accordance with the invention with a valve of the above-mentioned type in that the, preferably, disc-like closing body has at least one opening and one opening-free section of the closing body is disposed in alignment with the housing flow channel.

In the inventive underpressure valve, the closing body is formed, in particular, by a disc-like element which has at least one opening for the passage of air. An opening-free section of the closing body is located in alignment with the flow channel so that this opening-free section will be suctioned towards the flow channel above a certain flow velocity, thereby sealing the channel. The principle is known e.g. from return valves wherein a ball is suctioned into a conical end of a flow channel and seals off the flow channel at that location. The opening-free section may be disc-shaped, ball-shaped, or spherical.

The use of a disc-like closing body has the substantial advantage that the production of the disc-like closing body is simpler and therefore less expensive than of a ball, since the closing body can be produced e.g. using a punching method.

In a further development, the housing consists of two parts and the closing body is disposed between the two housing parts. This substantially facilitates mounting of the underpressure valve since the closing body must merely be disposed between the two housing parts.

Mounting is thereby advantageously effected by clamping the edge of the closing body between the two housing parts thereby fixing the position of the closing body. Large forces may act on the closing body without displacing same inside the housing. This ensures that the opening-free section of the closing body is always aligned with the flow channel so that the channel may be closed.

The first housing part is preferably screwed at least partially into the second housing part. The screw connection provides a secure joining of the two housing parts, wherein the first housing part can be easily released from the second housing part e.g. for maintenance or repair.

In a further development, the first housing part is substantially pot-shaped and engages with its free edge in a pot-shaped receiving opening of the second housing part thereby forming a receiving space inside the housing for accepting the closing body.

The free edge of the first housing part is thereby supported on the closing body and fixes same within the housing. For mounting, the closing body is merely loosely disposed into the receiving opening of the second housing part, wherein the first housing part effects fixing.

The pot-shaped receiving opening preferably has a central depression which is disposed directly in alignment with the opening-free section of the closing body. The at least one opening of the closing body communicates with an axial extension of the depression so that the air can flow via the opening into the depression.

The depth of the depression can be advantageously varied. This is effected e.g. through insertion of suitable spacers or similar elements. The depth of the depression adjusts the response behavior of the underpressure valve, in particular the point in time at which closing and opening occurs.

The closing body is preferably formed by an edge and an opening-free section which is located within the edge, wherein the opening-free section is connected to the edge via at least two, in particular, three bridges. The air flows through the openings from one housing part to the other and bypasses the opening-free section required for closing the valve. The bridges separating the openings thereby form elastic holding means for the opening-free section so that its position within the valve can be changed. The bridges are thereby uniformly distributed about the periphery and extend in a radial direction.

The closing body is preferably formed by an elastomeric disc which is sufficiently flexible to move from a resting position into a deflected position in which it closes the valve. It also has optimum sealing properties when it abuts the flow channel.

Each housing part has an element for connection to an underpressure supply, a vacuum connection, an underpressure guide element or suctioning elements.

In one embodiment, several first and several second housing parts are combined into a first and a second surface gripping part thereby forming grippers for gripping large-surface objects, in particular having irregular contours. The production of such surface grippers is relatively simple since the individual surface gripping parts must merely be interconnected, with the closing body mat being fixed between them. The surface gripper parts or at least their active elements may be made from plastic material.

Further advantages, features and details of the invention can be extracted from the following detailed description of a particularly advantageous embodiment with reference to the drawings. The features shown in the drawing and mentioned in the description and in the claims may be essential for the invention either individually or collectively in arbitrary combination.

DESCRIPTION OF THE PREFERRED EMBODIMENT

Figure 1:
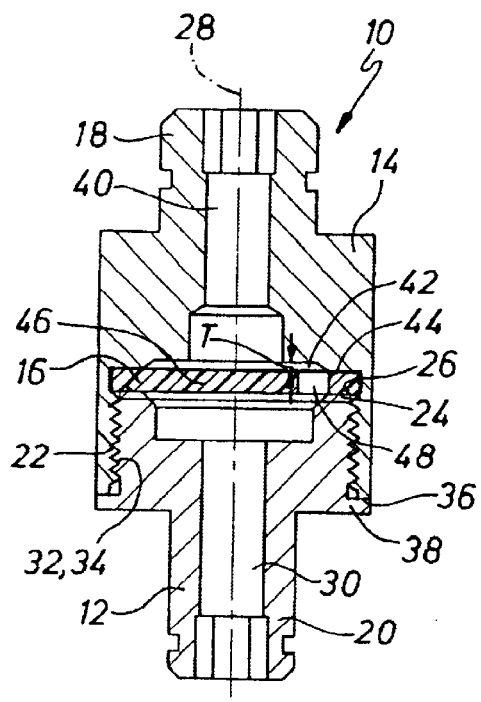
FIG. 1 shows a longitudinal section through an underpressure valve comprising a closing body in the rest position.

FIG. 1 shows an underpressure valve designated in its totality with 10 with a first housing part 12 and a second housing part 14 and an intermediate closing body 16. Both housing parts 12 and 14 have elements 18 and 20 for connection to an underpressure supply or vacuum connection. The first housing part 12 is pot-shaped and has an external thread 22 around its outer periphery, wherein the free edge 24 has a bead 26 projecting at the end face. A flow channel 30, which widens in the region of the free pot-shaped end, is located in the axis 28 of the first housing part 12.

The second housing part 14 is also pot-shaped and has an inner thread 24 at its inner pot wall 32 into which the outer thread 22 of the first housing part 12 is screwed. The free edge 36 of the second housing part 14 abuts a shoulder 38 of the first housing part 12 which limits the screwing depth. The second housing part 14 is also penetrated by an axial flow channel 40 which merges into a central depression 42 in the region of the pot.

Figure 3:
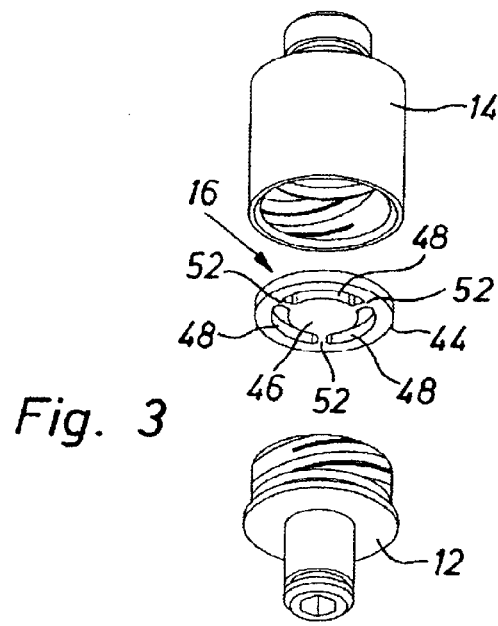
FIG. 3 shows a perspective explosive view of the valve.

The central depression 42 is opposite to the closing body 16 which is inserted in the pot of the second housing part 14. The closing body 16 (shown in more detail in FIG. 3) is thereby non-displaceably held at its edge 44 by the free edge 24 of the first housing part 12. The bead 26 thereby penetrates into the edge 44 of the closing body 16. An opening-free section 46 is opposite the two flow channels 30 and 40 and has the shape of a circular disc (FIG. 3). A total of three openings 48 are disposed between the edge 44 and the opening-free section 46 which provide passage for air flow from the flow channel 30 to the flow channel 40. The openings 48 are thereby located in alignment with the central depression 42.

Figure 2:
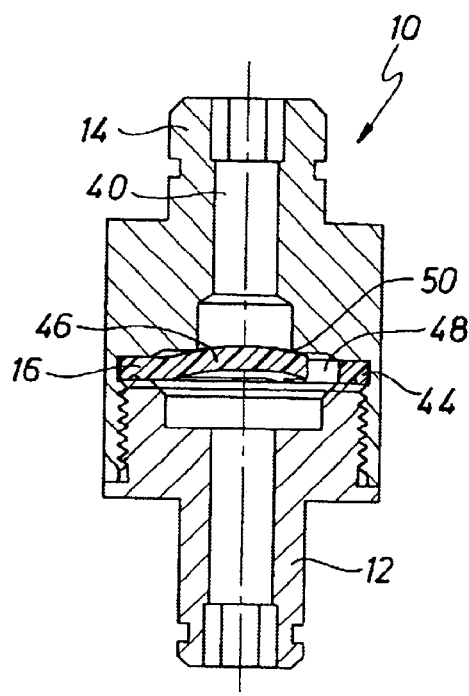
FIG. 2 shows a longitudinal section through the valve in accordance with FIG. 1 with a valve body disposed in the working position.

If the flow channel 40 is connected to an underpressure source and the flow channel 30 is connected to the surroundings, a relatively large amount of air is suctioned. A high flow velocity is produced within the depression 42 due to the small flow cross-section (small depth T). Due to the underpressure in the depression 42 produced by the high flow velocity, the opening-free section 46 of the closing body 16 is drawn against the free end of the flow channel 40 (FIG. 2). The edge 50 of the flow channel 40 is thereby tightly sealed by the closing body 16 so that air is no longer suctioned from the flow channel 30. The closing body 16 is thereby held at the edge 44 and the opening-free section 46 abuts the edge 50 of the flow channel 40 due to the deformation of the bridges 52. The constant suctioning of air produces an underpressure in the flow channel 40 which keeps the section 46 continuously pressed against the edge 44.

The depth T of the central depression sets the response behavior of the underpressure valve 10, in particular the flow volume at which the valve closes. The larger the depth T, the larger the flow volume needed to close the valve. Adjustment of the response behavior can also be produced through changing the diameter of the depression 42.

In a preferred fashion, a bypass can be provided which connects the depression 42 with the flow channel 40 and through which air also flows when the valve is closed, i.e. when the opening-free section 46 abuts the edge 50. Advantageously, the cross-section of this bypass can be set so that the leaking air flow there can be set to a desired value.

We claim:

1. An underpressure valve, the valve comprising:
    a first housing part having an axial, central first flow channel, said first flow channel having an upper and a lower opening;
    a second housing part attached to said first housing part, said second housing part having a second flow channel, said second flow channel having an upper opening and an edge defining a lower opening, said second housing part also having a central depression extending in a substantially radial direction from said edge; and
    a closing body having a central opening-free section and at least one radially outward opening, said closing body clamped between said first housing part and said second housing part, wherein said central depression, said edge, and said closing body are structured and dimensioned such that, in response to application of vacuum at said second flow channel upper opening, air flows through said first flow channel, out of said first flow channel upper opening, through said closing body opening, through said central depression, and past said edge into and through said second flow channel and, upon attainment of a defined flow velocity through said central depression, said central opening-free section is urged by an underpressure in said central depression to seal against said edge and block further air flow.

2. The underpressure valve of claim 1, wherein said closing body is disc-like.

3. The underpressure valve of claim 1, wherein said first housing part is at least partially screwed into said second housing part.

4. The underpressure valve of claim 1, wherein said first housing part has a substantially pot-shaped end defining a edge which engages in a pot-shaped recepticle of said second housing part.

5. The underpressure valve of claim 4, wherein said edge of said first housing part seals against said closing body.

6. The underpressure valve of claim 4, wherein said closing body is inserted into said recepticle of said second housing part.

7. The underpressure valve of claim 1, wherein said least one opening of said closing body is disposed in an axial extension of said central depression.

8. The underpressure valve of claim 1, wherein a depth of said central depression is variable.

9. The underpressure valve of claim 1, wherein said closing body comprises an edge portion surrounding said opening-free section, wherein said opening-free section is connected to said edge portion via at least one bridge.

10. The underpressure valve of claim 9, wherein said opening-free section is connected to said edge portion via three bridges.

11. The underpressure valve of claim 9, wherein said bridge extends in a radial direction.

12. The underpressure valve of claim 11, wherein there are a plurality of bridges which are uniformly distributed about said closing body.

13. The underpressure valve of claim 1, wherein said closing body consists essentially of an elastomeric disc.

14. The underpressure valve of claim 1, wherein each housing part comprises a connecting element for an underpressure supply or vacuum connection.

15. The underpressure valve of claim 1, wherein said opening-free section has a shape of one of a disc, a ball, and a sphere.

16. A surface gripper having several of the underpressure valves of claim 1, wherein several said first housing parts are combined into a first surface gripper part and several said second housing parts are combined into a second surface gripper part with several said closing bodies being disposed between said first and said second surface gripper parts.

17. The surface gripper of claim 16, wherein said several closing bodies are combined into a closing body mat.

* * * * *